US005763803A

United States Patent [19]

Hoshiai et al.

[11] Patent Number: 5,763,803

[45] Date of Patent: Jun. 9, 1998

[54] EFFECT ADDING SYSTEM CAPABLE OF SIMULATING TONES OF STRINGED INSTRUMENTS

[75] Inventors: Atsushi Hoshiai; Koji Iida, both of Osaka, Japan

[73] Assignee: Roland Kabushiki Kaisha, Osaka, Japan

[21] Appl. No.: 760,306

[22] Filed: Dec. 4, 1996

[30] Foreign Application Priority Data

Mar. 12, 1996 [JP] Japan .................................... 8-083139

[51] Int. Cl.$^{6}$ ............................. G01P 3/00; G10H 1/02; G10H 7/00

[52] U.S. Cl. ................................ 84/626; 84/630; 84/737

[58] Field of Search ............................ 84/616, 625, 654, 84/660, 661, 736, 737

[56] References Cited

U.S. PATENT DOCUMENTS

| | | | |
|---|---|---|---|
| 3,835,237 | 9/1974 | Adachi | 84/1.24 |
| 3,860,876 | 1/1975 | Woods | 84/737 |
| 4,627,323 | 12/1986 | Gold | 84/627 X |
| 5,256,830 | 10/1993 | Takeuchi et al. | 84/630 X |
| 5,386,082 | 1/1995 | Higashi | 84/630 |
| 5,498,835 | 3/1996 | Ichiki | 84/630 |
| 5,597,970 | 1/1997 | Sato et al. | 84/661 X |

FOREIGN PATENT DOCUMENTS

| | | |
|---|---|---|
| 55-117195 | 9/1980 | Japan . |
| 5-73066 | 3/1993 | Japan . |
| 6-289877 | 10/1994 | Japan . |

*Primary Examiner*—William M. Shoop, Jr.
*Assistant Examiner*—Jeffrey W. Donels
*Attorney, Agent, or Firm*—Lyon & Lyon LLP

[57] ABSTRACT

An object of the present invention is to obtain musical tones being equivalent to those of an acoustic guitar with a hollow body with only an electric guitar with a solid body. For the sake of attaining this object, the effecting system according to the present invention is composed of an absolute value detecting means for detecting absolute values of musical tone signals in response to oscillations of the strings, a delay time setting means for setting a delay time based on the absolute values detected by the above described absolute value detecting means, and a delay means for delaying the above described musical tone signals by the delay time which was set by the above described delay time setting means.

19 Claims, 9 Drawing Sheets

GRAPHS OF α = 1.6 AND α = 0.65 ARE INDICATED BY SLIDING UPWARDS AND DOWNWARDS BY 10 dB FROM REFERENCE GRAPH OF α =1.0, RESPECTIVELY.

*Fig. 9*

FORMULA 1

$$(1-m)\times data(L)+m\times data(L+1)$$

data (L) : DATA READ FROM ADDRESS L
data (L+1) : DATA READ FROM ADDRESS (L+1)

FORMULA 2

$$f=\frac{\sin^{-1}(F/2)}{\pi}\times fs$$

fs : SAMPLING FREQUENCY

FORMULA 3

$$F_{new}=(1/K_1)\times F_{org}$$

$F_{org}$ : COEFFICIENT TO REFERENCE CENTER FREQUENCY
$F_{new}$ : COEFFICIENT TO CONVERTED CENTER FREQUENCY
$K_1$ : MAGNIFICATION OF HOLLOW BODY

FORMULA 4

$$f_{new}=\frac{1}{\frac{1}{f_s/2}-\frac{1}{\alpha}\left(\frac{1}{f_s/2}-\frac{1}{f_{org}}\right)}$$

$f_s$ : SAMPLING FREQUENCY
$f_{org}$ : REFERENCE CENTER FREQUENCY
$f_{new}$ : CONVERTED CENTER FREQUENCY
$\alpha$ : MAGNIFICATION OF HOLLOW BODY

EFFECT ADDING SYSTEM CAPABLE OF SIMULATING TONES OF STRINGED INSTRUMENTS

BACKGROUND OF THE INVENTION

1. Field of the Invention

The present invention relates to an effecting system, and more particularly to an effecting system used suitably for stringed instruments and the like.

2. Description of the Related Art

In general, electric guitar which is employed for performance or the like of rock'n'roll music or popular music is known as one of stringed instruments.

In such electric guitars, not a hollow body, but a solid body is adopted in most cases, and as a result, tones peculiar to electric guitar which have scarce vibrations unlike those obtained in the hollow body can be performed.

However, in the case where an electric guitar player wishes to play sounds like those having musical tones of acoustic guitar manufactured in the form of a hollow body, it is required to prepare a separate acoustic guitar with a hollow body together with its electric guitar manufactured in the form of a solid body.

On one hand, it has been proposed that a pickup is mounted on an acoustic guitar with a hollow body in accordance with necessity, and the so modified acoustic guitar is employed like an electric guitar with a solid body. There is, however, such a problem that when the sound of music is performed with an acoustic guitar having hollow body provided with a pickup, the hollow body vibrates excessively so that the musical tones peculiar to electric guitar with a solid body are corrupted.

Namely, the prior art involves such a problem that if a player wishes to obtain both the musical tones produced from an electric guitar with solid body and those produced from an acoustic guitar with hollow body, two types of guitar, i.e., both of an electric guitar with solid body and an acoustic guitar with hollow body must be prepared.

OBJECT AND SUMMARY OF THE INVENTION

The present invention has been made in view of the problems as described above involved in the prior art. Accordingly, an object of the present invention is to provide an effecting system which is adapted in such that musical tone signals derived from oscillations of strings or guts detected by a pickup mounted on an electric guitar with solid body are modified so as to simulate musical tones of acoustic guitar with hollow body, whereby such musical tones being equal to that of acoustic guitar with hollow body can be obtained with only the electric guitar with solid body.

In order to achieve the above described object, the effecting system according to the present invention is adapted such that the musical tone signal processing which is equal to that of a phenomenon caused by a hollow body in an acoustic guitar is applied to the musical tone signals based on oscillations of strings (hereinafter referred to occasionally as "string oscillations") detected by a pickup mounted on an electric guitar with solid body, thereby to simulate sounds derived from hollow body.

In other words, the effecting system according to the present invention contemplates modifying the musical tone signals which are based on string oscillations detected by a pickup mounted on an electric guitar with solid body to exactly simulate phenomena peculiar to an acoustic guitar with hollow body.

Actual oscillations of guts or strings in guitar will be examined herein. Generally, ideal form in string oscillations is realized by a stringed instrument wherein both ends of each string is perfectly fixed, and only the strings oscillate or vibrate. In an actual guitar, however, a bridge disposed on a guitar body and that which is expected to be a fixed end vibrates delicately as a result of being affected by the vibrations of its body itself due to the string oscillations. Particularly, since a bridge made of animal's bone or a synthetic resin is disposed on a hollow body made from thin plates in an acoustic guitar with hollow body, as compared with a bridge which is disposed on a solid body made from thick plates in an electric guitar, vibrations of the bridge are more remarkably observed in the acoustic guitar than in the electric guitar. In this respect, such vibrations of bridge are an important factor, because it can provide musical tones of beautiful and extensive sounds peculiar to acoustic guitar.

On the one hand, a usual pickup cannot sufficiently collect the frequency components in a high range peculiar to guitar, so that musical tones of electric guitar provided with such pickup as described above are quite different from those of an acoustic guitar which involve sufficient frequency components in a high range.

The effecting system according to the present invention contemplates simulating a phenomenon peculiar to acoustic guitar to the effect that the bridge is vibrated on the basis of the above described string oscillations to affect musical tones as well as a phenomenon peculiar to acoustic guitar to the effect that the frequency components in a high range are ample by means of processing and modifying musical tone signals based on the string oscillations in an electric guitar with solid body which are detected by the pickup on the electric guitar.

Accordingly, the effecting system according to the present invention is composed of an absolute value detecting means for detecting absolute values of musical tone signals in response to oscillations of strings; a delay time setting means for setting a delay time based on the absolute values detected by the aforesaid absolute value detecting means; and a delay means for delaying the aforesaid musical tone signals by the delay time which was set by the aforesaid delay time setting means.

Furthermore, the effecting system according to the present invention is composed of an absolute value detecting means for detecting absolute values of signals obtained by mixing a plurality of musical tone signals in response to string oscillations of a plurality of strings; a delay time setting means for setting delay times based on the absolute values detected by the aforesaid absolute value detecting means; and a delay means for delaying a musical tone signal corresponding to a prescribed string in the aforesaid plural musical tone signals by a delay time which was set by the aforesaid delay time setting means.

Moreover, the effecting system according to the present invention is composed of a delay time setting means for setting a delay time based on the values of musical tone signals in response to oscillations of strings; a pitch detecting means for detecting pitches of the aforesaid musical tone signals; a delay time correcting means for correcting the delay time which was set by the aforesaid delay time setting means such that the shorter delay time is produced by the higher pitches described above based on the pitches detected by the aforesaid pitch detecting means; and a delay means for delaying the aforesaid musical tone signals by the delay time corrected by the aforesaid delay time correcting means.

Still further, the effecting system according to the present invention is composed of an absolute value detecting means for detecting absolute values of musical tone signals corresponding to oscillations of strings; a delay time setting means for setting a delay time based on the absolute values detected by the aforesaid absolute value detecting means; a pitch detecting means for detecting pitches of the aforesaid musical tone signals; a delay time correcting means for correcting the delay time which was set by the aforesaid delay time setting means in such that the shorter delay time is produced by the higher pitches described above based on the pitches detected by the aforesaid pitch detecting means; and a delay means for delaying the aforesaid musical tone signals by the delay time corrected by the aforesaid delay time correcting means.

Yet further, the effecting system according to the present invention is composed of an absolute value detecting means for detecting absolute values of signals obtained by mixing a plurality of musical tone signals in response to string oscillations of a plurality of strings; a delay time setting means for setting delay times based on the absolute values detected by the aforesaid absolute value detecting means; a pitch detecting means for detecting a pitch of a musical tone signal corresponding to a prescribed string in the aforesaid plural musical tone signals; a delay time correcting means for correcting the delay time which was set by the aforesaid delay time setting means in such that the shorter delay time is produced by the higher pitches described above based on the pitches detected by the aforesaid pitch detecting means; and a delay means for delaying a musical tone signal corresponding to a prescribed string in the aforesaid plural musical tone signals by a delay time which was corrected by the aforesaid delay time correcting means.

In other words, the above described respective effecting systems according to the present invention intend to simulate the phenomenon where tones are affected by the vibration or oscillation of a bridge, being a terminal of strings, with the string oscillations themselves by means of phase modulation due to self-modulation in which the same musical tone signals are used as modulated waves and modulating waves. Such phase modulation is attained by delaying musical tone signals responding to string oscillations by a delay time corresponding to their absolute values or pitches, or by a delay time corresponding to their absolute values and pitches. Additionally, the effecting system according to the present invention contemplates simulating such a phenomenon in which frequency components are ample in a high region by means of adding metallic frequency components in a high range as a result of conducting the phase modulation. In this case, target signals for detecting absolute values may be either musical tone signals in response to string oscillations of a single string, or signals obtained by mixing a plurality of musical tone signals in response to string oscillations of a plurality of strings.

More specifically, according to the effecting system of the present invention simulating such a phenomenon, tones are more delicately varied with minute vibrations of a bridge based on string oscillations in acoustic guitar with hollow body and the frequency components in a high range are beautiful and extensive which are peculiar to acoustic guitar and are simulated by means of phase modulation due to self-modulation.

In this case, when absolute values of musical tone signals in response to string oscillations are utilized as modulating waves, there is no need to add offset, so that there is no delay of musical tones due to the offset, whereby a player does not feel unpleasant tones.

Furthermore, when modulating waves in response to pitches of musical tone signals relating to string oscillations are utilized, it becomes possible to apply uniform modulation in all the frequency bands.

In the effecting systems according to the present invention described above, while it has been constituted such that pitches are detected by a pitch detecting means to effect required processing, the processing may be carried out by detecting other factors than the pitches such as periods, wavelengths or the like being equivalent to the pitches.

In other words, while the invention can use pitches detected by a means of a pitch detecting means to conduct the processing, the equivalent functions and advantages of the invention can also be attained, if factors other than the pitches such as periods, wavelengths or the like being equivalent to the pitches are detected to effect the processing.

Furthermore, the effecting system according to the present invention is composed of a plurality of filter means into which are inputted musical tone signals in response to oscillations of strings; a synthesizing means for synthesizing outputs of the aforesaid plural filter means; and a correcting means for correcting respective reference frequencies of the aforesaid plural filter means which have been previously set such that the lower reference frequency is produced by the larger size of a hollow body which is the target of simulation in response to the information indicating the size of the aforesaid hollow body being the target of simulation.

In this case, the above described effecting system may be constituted either such that the aforesaid correcting means corrects all the respective reference frequencies of the aforesaid plural filter means which have been previously set at a uniform ratio, respectively, or such that an amount of the reference frequencies to be corrected in a low range is larger than that of the reference frequencies in a high range among the respective reference frequencies of the aforesaid plural filter means which have been previously set.

As a result, according to the above described respective effecting systems of the present invention, it is possible to simulate such a phenomenon peculiar to acoustic guitar to the effect that as the size of a hollow body increases, the frequency characteristics shift to the side of a low range.

Moreover, the effecting system according to the present invention is composed of a plurality of filter means into which are inputted musical tone signals in response to oscillations of strings; a synthesizing means for synthesizing outputs of the aforesaid plural filter means; a storage means for storing sets of respective reference frequencies of the aforesaid plural filter means which correspond to frequency characteristics of hollow bodies having a variety of sizes and are set such that the lower frequencies are produced by the larger sizes of the aforesaid hollow bodies; and a setting means for selecting a set of reference frequencies corresponding to the information indicating a size of a hollow body being the target of simulation from the sets of the respective reference frequencies of the aforesaid plural filter means stored in the aforesaid storage means and setting the respective reference frequencies of the sets of reference frequencies selected to the aforesaid corresponding plural filter means, respectively.

In this case, the above described setting means may be constituted either such that it selects sets of reference frequencies in which all the respective reference frequencies of the aforesaid plural filter means which are set at present are modified at a uniform ratio from the sets of reference frequencies stored in the aforesaid storage means to set the respective reference frequencies of the sets of the reference frequencies selected to the aforesaid corresponding plural filter means, respectively, or such that it selects sets of reference frequencies in which the respective reference frequencies of the aforesaid plural filter means which are set at present are modified in such a manner that an amount of the reference frequencies to be modified in a low range is larger than that of a high range from the sets of reference frequencies stored in said storage means to set the respective reference frequencies of the sets of the reference frequencies selected to the aforesaid corresponding plural filter means, respectively.

Thus, according to the above described respective effecting systems of the present invention, it is easily possible to simulate such a phenomenon peculiar to acoustic guitar to, the effect that as the size of a hollow body increases, the frequency characteristics shift to the side of a low range by means of selecting a set of respective center frequencies of a plurality of band pass filter means stored in the storage means and setting the respective center frequencies of the sets of center frequencies selected to the corresponding plural band pass filter means, respectively, with the use of the setting means.

Still further, the above described effecting system provided with a plurality of filter means according to the present invention may be constituted such that an all pass filter means into which are inputted musical tone signals in response to oscillations of strings is further provided, and into said plural filter means are inputted musical tone signals in response to the oscillations of strings which were passed through the aforesaid all pass filter means.

As described above, as a result of adding the all pass filter means by which such reverberation sound, the frequency characteristics thereof are flat, is obtained, it is possible to simulate beautiful and extensive sounds of a hollow body.

Yet further, the above described effecting system provided with a plurality of filter means according to the present invention may be constituted in such that at least one member selected from the aforesaid plural filter means is a band pass filter, and the reference frequency of the aforesaid band pass filter is the center frequency, or that at least one member selected from the aforesaid plural filter means is a low pass filter, and the reference frequency of the aforesaid low pass filter is a cut-off frequency, or that at least one member selected from the aforesaid plural filter means is a high pass filter, and the reference frequency of the aforesaid high pass filter is a cut-off frequency.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 9 is an explanatory view showing formulas 1, 2, 3, and 4, respectively.

DETAILED DESCRIPTION OF THE PREFERRED EMBODIMENTS

In the following, manners of practice for the effecting system according to the present invention will be described in detail hereinafter by referring to the accompanying drawings.

Figure 1:
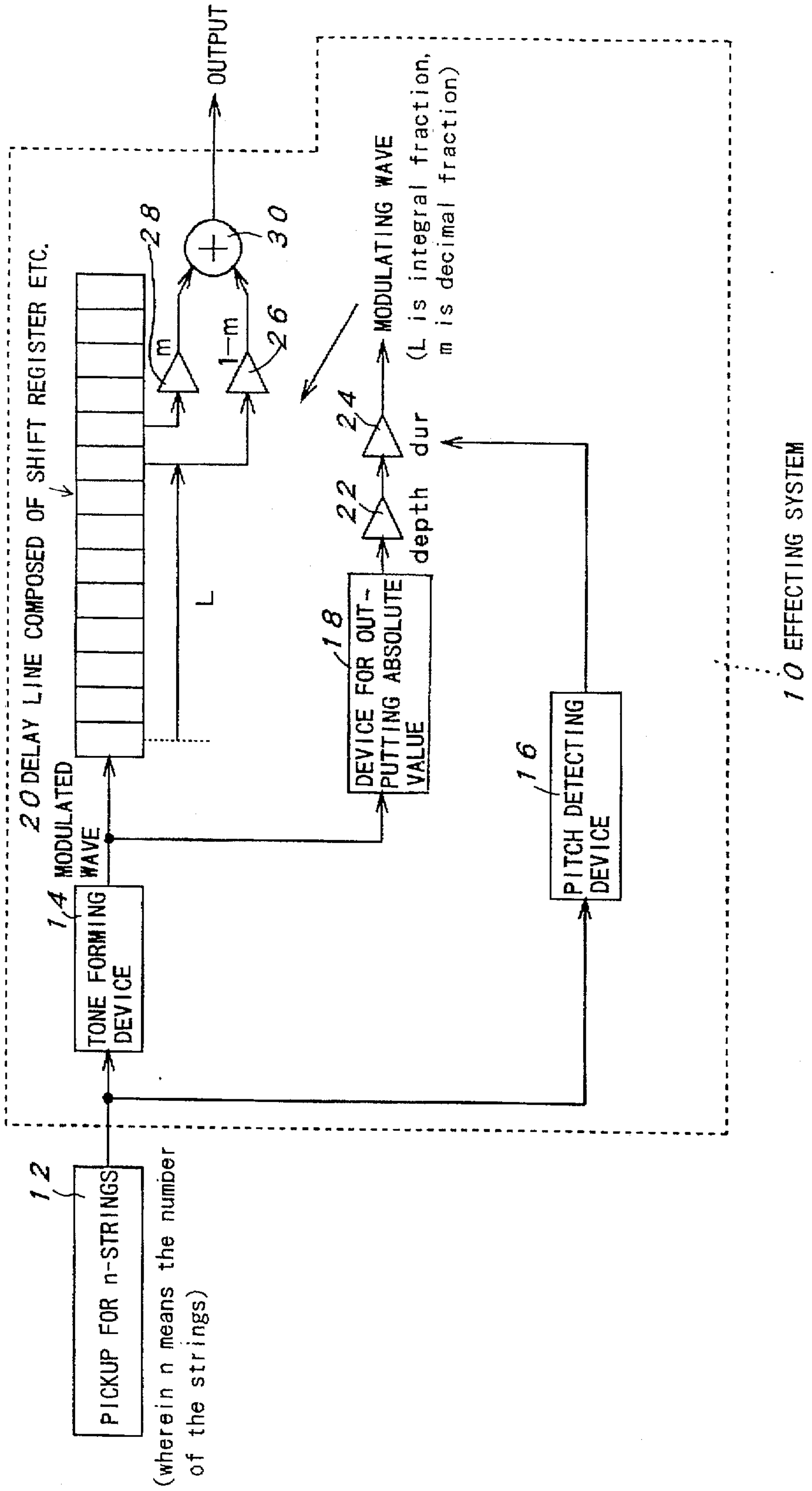
FIG. 1 is a constitutional block diagram showing a first example of the manner of practice of the effecting system according to the present invention.

FIG. 1 shows the first example in the manners of practice of the effecting system according to the present invention wherein the effecting system 10 is constituted such that musical tone signals are inputted through a pickup 12 for n-strings (wherein n means the number of the strings in an electric guitar, i.e., if the number thereof is six, then "n=1 to 6, inclusive") of a type of respective independent strings in the electric guitar with solid body.

The pickup for n-strings 12 of the respective independent string type is a means for detecting independently string oscillations of the n-strings on an electric guitar with a solid body in every string to convert the same into electrical signals, respectively, and supplying the resulting electric signals to the effecting system 10 as musical tones.

The musical tone signals supplied to the effecting system 10 are delivered to a tone forming device 14 and a pitch detecting device 16, respectively. The musical tone forming device 14 is a means for varying frequency characteristics of the musical tone signals supplied from the pickup for n-strings 12 and which is, for example, composed of filters and the like. Furthermore, the pitch detecting device 16 is a means for detecting pitches of the string oscillations detected by the pickup for n-strings 12 to obtain pitch information and which is used for controlling modulating waves as mentioned hereinafter.

The musical tone signals, the frequency characteristics of which have been controlled by the tone forming device 14, are delivered to a device for outputting absolute value 18 and at the same time, supplied to a delay line 20 composed of a shift register or a random access memory being readable and writable in a ring-shaped form (hereinafter referred to as "ring-form memory") and the like components which conduct phase modulation as modulated wave signals.

The device for outputting absolute value 18 is a means for outputting absolute value signals indicating absolute values of musical tone signals the frequency characteristics of which have been controlled and outputted from the tone forming device 14, and the resulting absolute value signals are supplied to a first multiplier 22.

The first multiplier 22 is a means for multiplying the absolute value signals outputted from the absolute value outputting device 18 by a coefficient indicating a depth of modulation which has been set by a user with the use of an operating knob or the like (not shown), and the multiplied result is fed to a second multiplier 24.

The second multiplier 24 multiplies the multiplied result in the first multiplier 22 by a coefficient indicating a value (dur) in response to wavelength based on the pitch information delivered from the pitch detecting device 16 to produce modulating wave and reads the modulated wave which was inputted to the delay line 20 by means of the modulating wave, thereby to effect phase modulation. In other words, the phase modulation by means of self-modulation which utilizes musical tone signals supplied from the pickup for n-strings 12 as modulated waves and modulating waves is carried out in the effecting system 10.

Namely, the effecting system 10 is adapted to simulate a phenomenon which affects tones as a result of the vibration of a bridge being the terminal of strings due to the string oscillations by themselves in an acoustic guitar by executing phase modulation in accordance with a manner of varying a read-out address in the delay line. In this respect, for the sake of conducting smoothly the phase modulation, it is required to set a length of the delay line while also taking the decimal fraction thereof into consideration, and there is a manner of linear interpolation as the simplest manner for setting a length of delay line including the decimal fraction thereof.

In other words, it means that an instantaneous value of the modulated waves is allowed to respond to read-out address of the delay line, and the decimal fraction of the address is adapted to receive linear interpolation.

More specifically, when the integral fraction and the decimal fraction of a value of the modulated wave are represented by L and m ($0 \leqq m < 1$), respectively, in FIG. 1, the effecting system 10 is constituted such that an output from a multiplier 26 for multiplying data which is read from the delay line 20 with a delay by an address L by a coefficient (1−m) and an output from a multiplier 28 for multiplying data which is read from the delay line 20 with a delay by an address (L+1) by a coefficient m are added by means of an adder 30 to obtain musical tone signals which are to be outputted from the effecting system 10.

In the following, a detailed description will be made by referring to FIG. 2 upon the above described point of constitution for subjecting linear interpolation to the decimal fraction of an address in such a manner that the data read from the delay line 20 with the delay by the address L is multiplied by the coefficient (1−m) and at the same time, the data read from the delay line 20 with the delay by the address (L+1) is multiplied by the coefficient m, and then these multiplied results are added to obtain the output.

Figure 2:
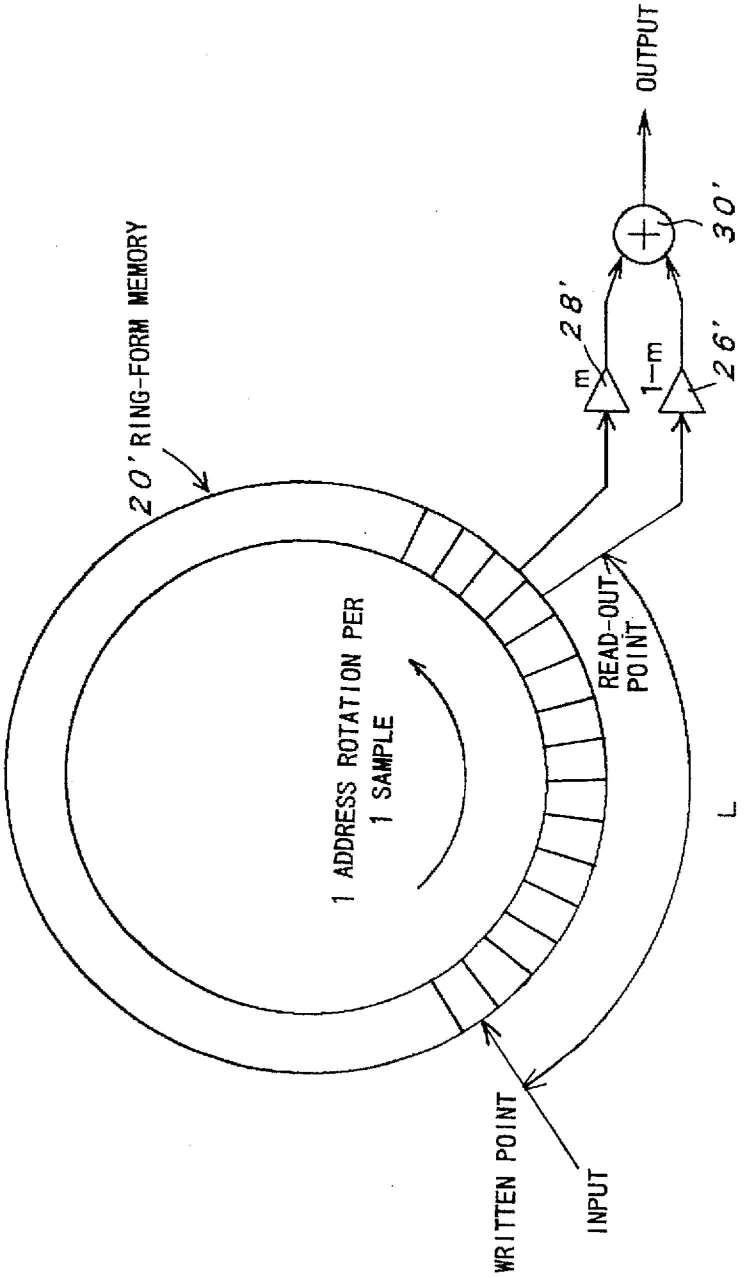
FIG. 2 is an explanatory view indicating a delay line composed of a ring-form memory.

FIG. 2 is an explanatory view showing an example in which a delay line is constituted by the use of a ring-form memory 20'. This ring-form memory 20' rotates 1 (one) address in each 1 (one) sample, so that data read from the address (readout point) with a deviation by L from a writing point is the data which has been written prior to L samples therefrom, whereby a delay of length L can be composed.

As described above, in order to perform smoothly phase modulation, it is required to set a length of the delay line while also taking the decimal fraction thereof into consideration, and the simplest manner for setting the length of the delay line inclusive of the decimal fraction is linear interpolation.

Namely, when a length of the delay line is represented by "L+m", the linear interpolation thereof can be expressed by formula 1 shown in FIG. 9.

For the sake of realizing the processing of this formula 1, it is arranged such that an output of a multiplier 26' for multiplying data read from an address L in the ring-form memory 20' by a coefficient (1−m) and an output of a multiplier 28' for multiplying data read from an address (L+1) in the ring-form memory 20' by a coefficient m are added in an adder 30' to obtain musical tone signals output from the effecting system 10.

Furthermore, it is adapted in the effecting system 10 that a modulating wave is produced on the basis of the same musical tone signals as those of the modulated wave as described above.

In the meantime, when the case where an instantaneous value of the modulating wave becomes negative is considered, there arises the necessity of affording an offset such that a read-out address of the delay line 20 does not take a negative value. In the case as described above, when since a delay an amount of which corresponds to the offset arises, it results in sounds unpleasant to a player, so that it is undesirable in view of the performance.

For this reason, absolute values of musical tone signals have been previously kept by the device for outputting absolute value 18 in the effecting system 10, and modulation signals are adapted to be produced from these absolute values, so that the necessity for preparing the above described offset is eliminated.

Figure 3:
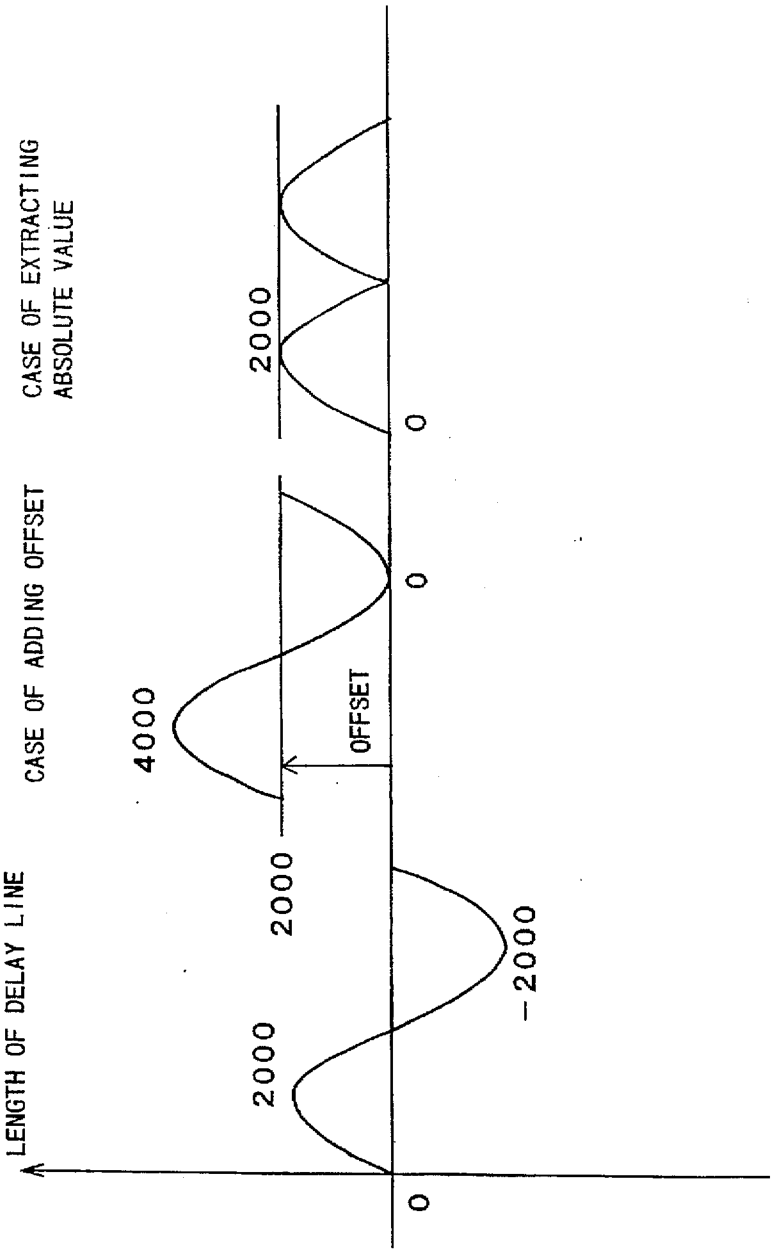
FIG. 3 is an explanatory view for explaining that there is no need to add offset in the case where absolute values of amplitude values of the musical tone signals inputted are utilized as modulating waves.

Namely, when a value obtained by calculating the maximum amplitude value of modulating wave in terms of a length of the delay line 20 is, for example, 2,000, the offset is also required by 2,000. Accordingly, when a sampling frequency is 50 Hz, a delay with no modulation becomes 40 ms. Since this delay of 40 ms is heard as sounds which are clearly delayed in view of auditory sense, it results in sounds unpleasant to a player, so that it disturbs the player's performance. In this respect, however, when a signal from which an absolute value has been previously extracted is given as the modulating wave, it is sufficient for such a situation that the offset is zero (0), so that there is no addition of extra delay, resulting in no disturbance of the performance (see FIG. 3).

On the other hand, when an instantaneous value of modulating wave is allowed to simply respond to a read-out address of the delay line 20, modulation of the higher degree is attained with the higher frequency, so that undesirable musical tones to be produced are obtained.

For this reason, the effecting system 10 is adapted in such that pitch detection of musical tone signals inputted is effected by means of the pitch detecting device 16, and an amplitude of modulating wave is controlled with a value (dur) corresponding to the wavelength by means of the multiplier 26, whereby uniform modulation can be applied in the whole frequency band. For instance, when the frequency increases x times higher, the wavelength becomes 1/x, so that the amplitude of modulating wave is adapted to become 1/x.

In this case, the pitch detection in the pitch detecting device 16 may be carried out by a well-known manner such as a manner for measuring zero-cross pitch or peak pitch of waveforms of musical tone signals and the like manner.

While the above described effecting system 10 has been constituted such that the modulating wave is produced from musical tone signals based on the detection of string oscillations of the same string as that in the case of modulated wave in the system wherein independent processing is conducted in every respective string, it may also be adapted to apply mutual interference by adding musical tone signals based on the detection of string oscillations of another string to the above described modulating wave.

Figure 4:
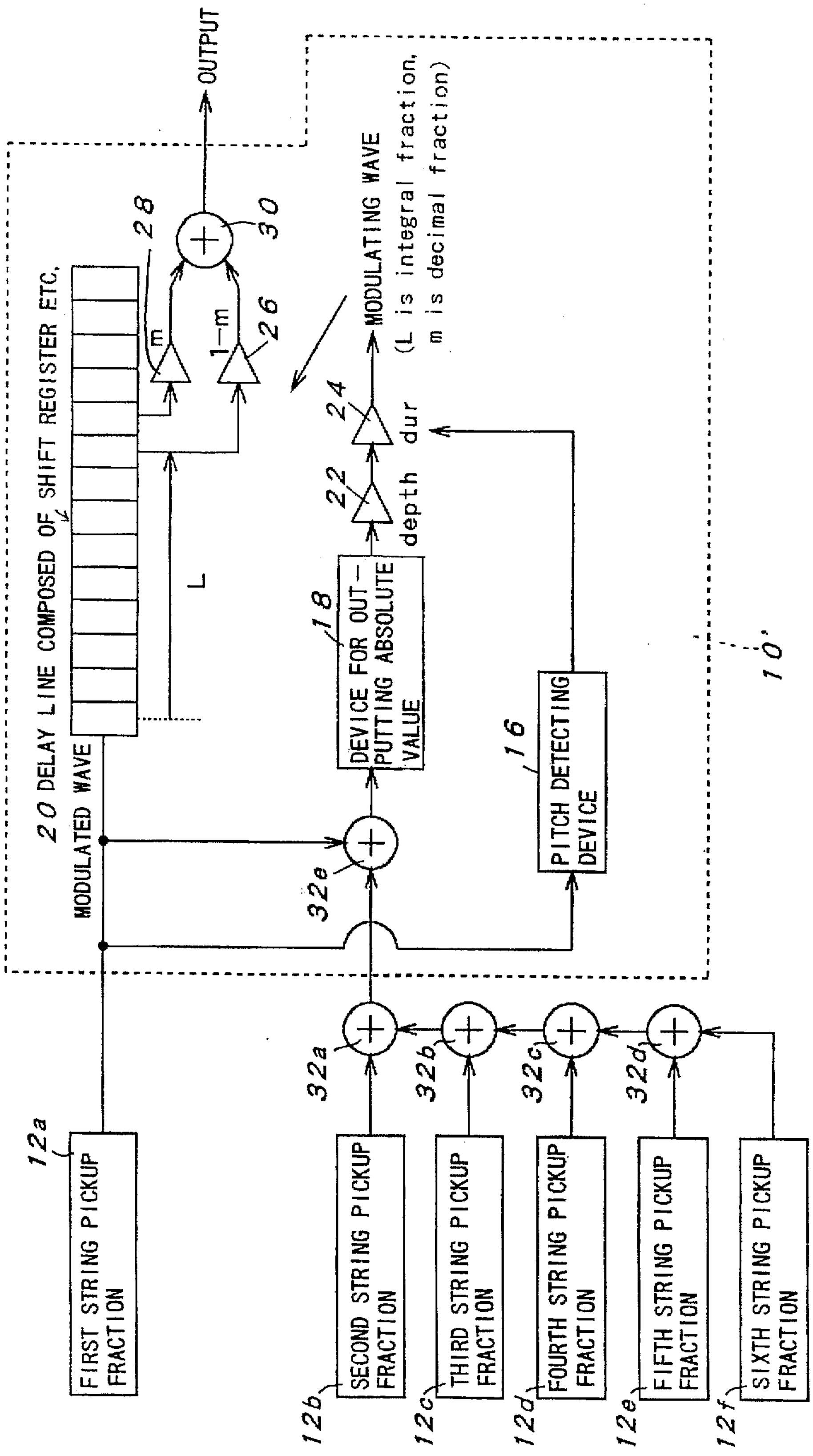
FIG. 4 is a constitutional block diagram, corresponding to that of FIG. 1, showing a constitutional example of the effecting system wherein absolute values are extracted after a plurality of musical tone signals derived from oscillations of a plurality of strings were added and they were mixed with each other, and the absolute values thus obtained are utilized as modulating waves.

For example, FIG. 4 is a constitutional diagram showing an effecting system 10' which is constituted such that musical tone signals obtained by adding those which have been obtained by adding the musical tone signals based on the detection of string oscillations outputted from a pickup fraction for a second string 12*b*, a pickup fraction for a third string 12*c*, a pickup fraction for a fourth string 12*d*, a pickup fraction for a fifth string 12*e*, and a pickup fraction for a sixth string 12*f* by means of adders 32*a*, 32*b*, 32*c*, and 32*d*, respectively, and separate musical tone signals based on the detection of string oscillations outputted from a pickup fraction for a first string 12*a* are added by means of an adder 32*e* are used as the modulating wave. In the effecting system 10' shown in FIG. 4, the same components as those in FIG. 1 are represented by the same reference numerals as those in FIG. 1, whereby the detailed constitution and the description as to functions thereof are omitted, and further the illustration of the constitution of the tone producing device is omitted.

As described above, although the effecting system 10' shown in FIG. 4 has been arranged such that modulating wave is obtained by extracting absolute values after a plurality of musical tone signals derived from oscillations of a plurality of strings are added and mixed with each other, it may be adapted such that after respective absolute values of a plurality of musical tone signals derived from oscillations of a plurality of strings were obtained, and then they are added and mixed with each other to be served for modulating wave.

Furthermore, as in the effecting system 10' shown in FIG. 4, strings may be suitably weighted to mix musical tone signals in the case of obtaining modulating waves by mixing a plurality of musical tone signals due to oscillations of a plurality of strings.

Namely, in an actual acoustic guitar, vibrations of all the strings affect one another to produce delicate oscillations in a bridge mounted on its hollow body. In this respect, it may be generally considered that the plucked string and the strings which are disposed closest with respect to the plucked former string vibrate more than the other strings. As an example of weighting, a manner wherein the weight of a string positioned near to the string (one which was plucked) corresponding to the signal on which phase modulation is to be applied is made heavier than the other strings or the like manner may be considered. More specifically, in the case of phase modulation corresponding to the first string, it may be utilized a manner wherein the heaviest weight is applied to the first string, and musical tone signals of the first to the sixth strings are weighted such that a stepwise lighter weight is applied to the second, the third, the fourth, the fifth, and the sixth strings in this order to mix them with each other, and then are added to the modulating wave.

Moreover, mixed musical tone signals derived from the first to the sixth signals, inclusive, may be subjected to phase modulation. In this case, even if a guitar which is not provided with independent type pickup fractions for respective strings is used, it becomes possible to simulate tones of an acoustic guitar. In that event, if pitch detection is possible, for example, pitch information of the highest tone is typically used, whereby the amplitude of modulating wave may be controlled.

Figure 5:
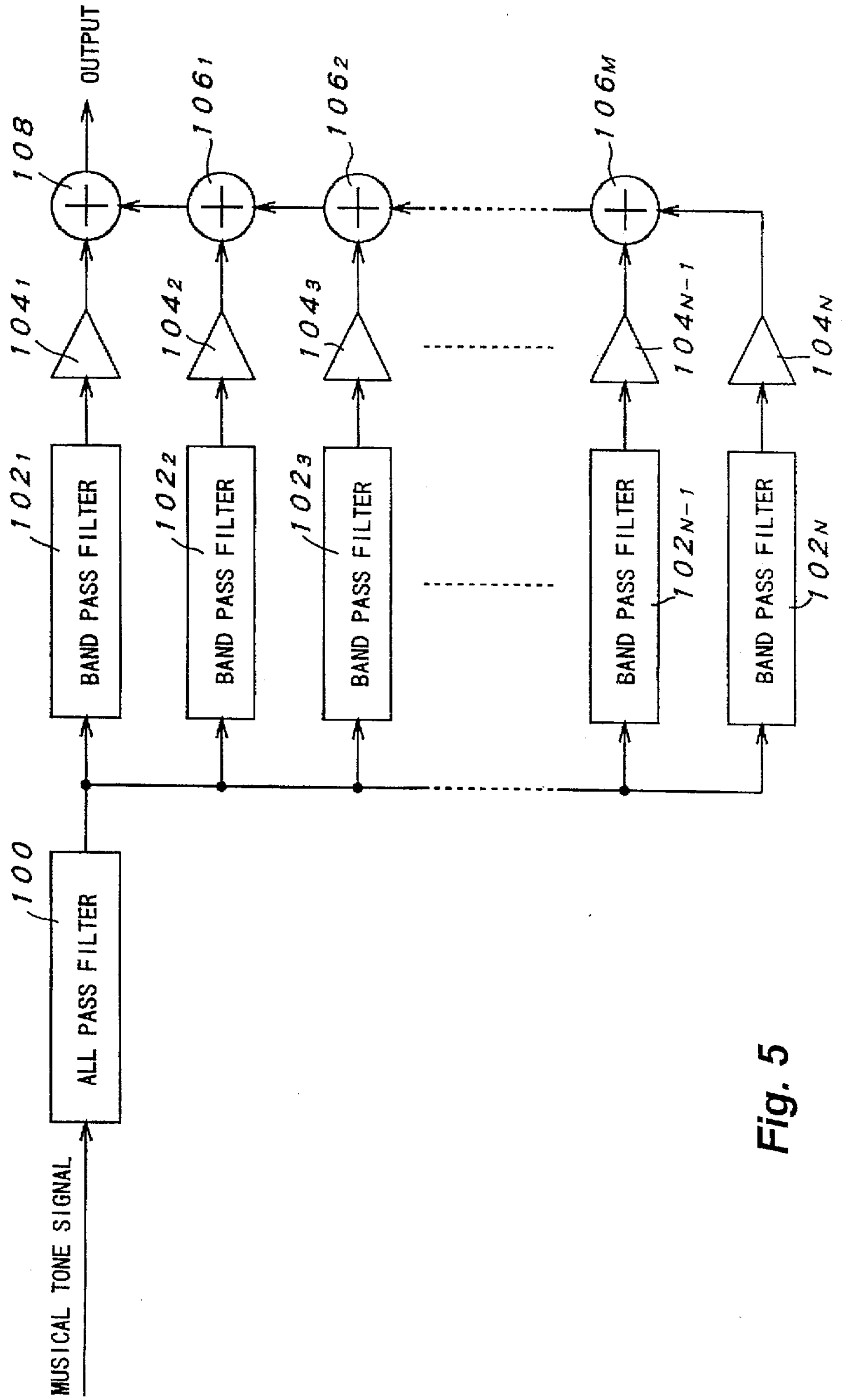
FIG. 5 is a constitutional block diagram showing a second example of the manner of practice of the effecting system according to the present invention.

FIG. 5 is a constitutional block diagram illustrating the second example of the manner of practice for the effecting system according to the present invention which contemplates simulating the frequency characteristic peculiar to an acoustic guitar with a hollow body and which are different from those derived from a solid body guitar by connecting parallell a plurality of (e.g., twenty-four) band pass filters.

Namely, the effecting system shown in FIG. 5 is composed of an all pass filter 100 for delivering musical tone signals based on the detection of oscillations of the n-th string outputted from an n-th string pickup (not shown), a plurality of band pass filters $\mathbf{102}_1$ to $\mathbf{102}_N$ (where N is a positive integer being 2 or more in the present specification) which are connected in parallel and follow the all pass filter 100 such that musical tone signals are supplied from the all pass filter 100 thereto, respectively, multipliers $\mathbf{104}_1$ to $\mathbf{104}_N$ for amplifying musical tone signals supplied from the band pass filters $\mathbf{102}_1$ to $\mathbf{102}_N$, adders $\mathbf{106}_1$ to $\mathbf{106}_M$ (where "M=N−2" in the present specification) for successively adding musical tone signals outputted from multipliers $\mathbf{104}_2$ to $\mathbf{104}_N$ to mix them, and an adder 108 for adding musical tone signals outputted from the multiplier $\mathbf{104}_1$ and musical tone signals outputted from the adder $\mathbf{106}_1$ to mix them with each other, thereby obtaining the musical tone signals outputted from the effecting system 10.

Figure 6:
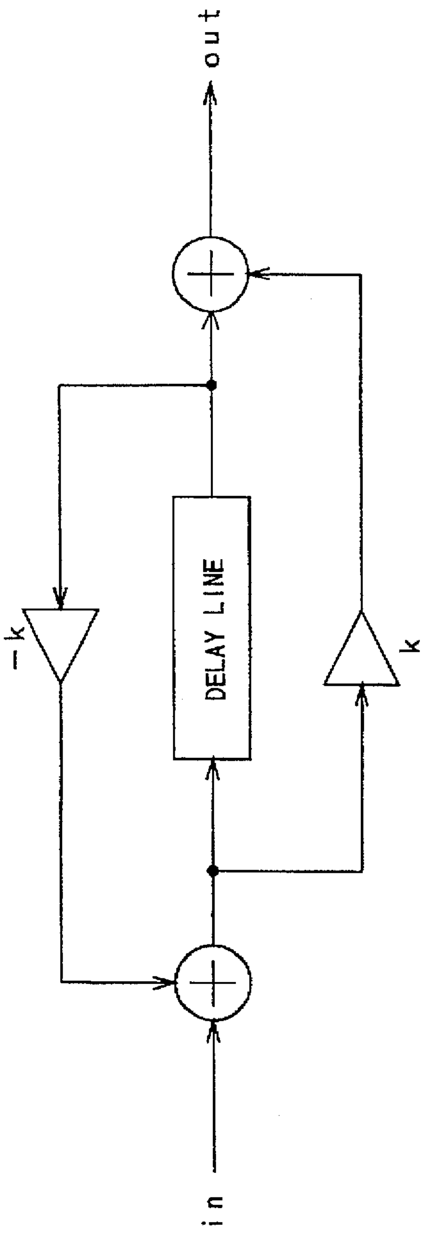
FIG. 6 is a constitutional block diagram showing a specific constitutional example of an all pass filter.

FIG. 6 is a block diagram showing a specific constitutional example of the all pass filter 100 wherein a coefficient k is selected so as to be "0.0<k<1.0". Since reverberations the frequency characteristics of which are flat can be obtained by such an all pass filter, it is possible to simulate beautiful and extensive sounds derived from a hollow body, and preferably is such a constitution wherein a plurality (for example, two to four) of the all pass filters 100 having the structure as described above are connected in series.

Figure 7:
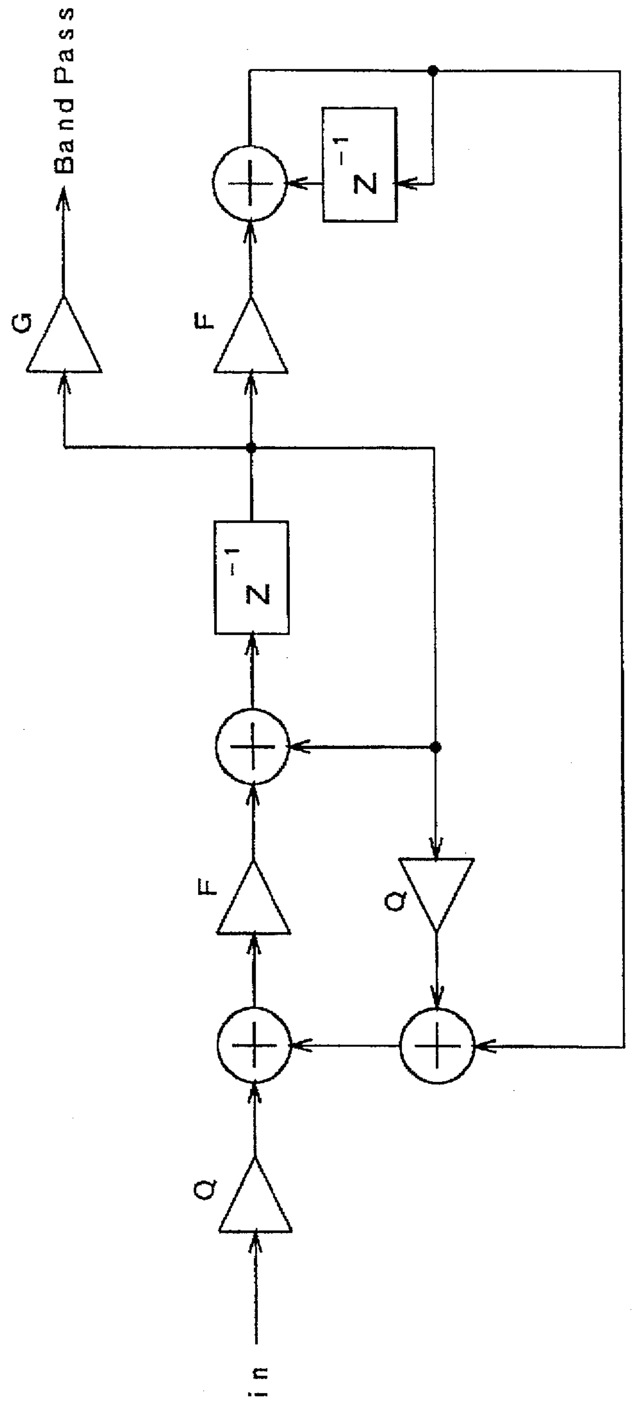
FIG. 7 is a constitutional block diagram showing a specific constitutional example of a band pass filter.

Furthermore, FIG. 7 is a block diagram showing a specific constitutional example of the respective band pass filters $\mathbf{102}_1$ to $\mathbf{102}_N$. When the band pass filter of a double integral type is constituted as shown in FIG. 7, a coefficient F and a coefficient Q can be easily controlled.

In the effecting system according to the present invention, variations in size and thickness of a hollow body are simulated by varying the coefficient F and the coefficient Q of such band pass filters $\mathbf{102}_1$ to $\mathbf{102}_N$.

The center frequency f of a band pass filter can be expressed herein by the formula 2 shown in FIG. 9, and it is known that the center frequency f of a band pass filter is substantially proportional to the coefficient F.

Accordingly, when values of coefficient F in the respective band pass filters $\mathbf{102}_1$ to $\mathbf{102}_N$ are doubled, respectively, each central frequency f thereof doubles also in response thereto, so that tone height becomes higher by one octave as a whole. In other words, an equivalent effect in the reduction of the size of the hollow body can be obtained. As described herein, when a value of the coefficient F is increased, an equivalent effect in the reduction of the size of the hollow body can be obtained, whereas when the value of the coefficient F is decreased, an equivalent effect in the increase of the size of the hollow body can be attained.

Namely, when a coefficient as to a center frequency which is to be a standard (reference frequency), a coefficient as to a center frequency converted, and a magnification (for example, around 0.5 to 2.0) of a hollow body are represented by $F_{org}$, $F_{new}$, and $K_1$, respectively, formula 3 shown in FIG. 9 is established, and in which when $K_1$ is arbitrarily set, it is possible to simulate a hollow body having a suitable size.

In this case, setting for the reference center frequency in each of the band pass filters $\mathbf{102}_1$ to $\mathbf{102}_N$ may be effected by analyzing frequency characteristics of a target hollow body to be simulated by a suitable manner, or it may be adapted to be able to arbitrarily set by an operator.

While the above described example has been constituted such that the coefficient $F_{new}$ as to the center frequency converted with respect to each of the band pass filters $\mathbf{102}_1$ to $\mathbf{102}_N$ is determined in reference to the magnification $K_1$ of a hollow body and the coefficient $K_{org}$ as to the reference center frequency by performing an operation in accordance with the transform of formula 3, whereby the center frequency in each of the band pass filters $\mathbf{102}_1$ to $\mathbf{102}_N$ is set, the constitution is not limited thereto, but it may be constituted such that a set of center frequencies of the respective band pass filters $\mathbf{102}_1$ to $\mathbf{102}_N$ corresponding to the respective magnifications $K_1$ have been stored previously in a suitable storage means, and the corresponding set of center frequencies is read out from the aforesaid storage means in response to designation of $K_1$ to set each center frequency in each of the band pass filters.

Furthermore, it is known that a value q indicating sharpness of frequency characteristics in a band pass filter is expressed by the following equation:

$$q=1/Q$$

Accordingly, when a value of the coefficient Q is increased, a resonance time decreases, whereas a value of the coefficient Q is decreased, the resonance time increases.

Namely, when a reference coefficient, a coefficient converted, and a magnification of resonance time (e.g. around 0.5 to 2.0) are expressed by $Q_{org}$, $Q_{new}$, and $K_2$, respectively, $$Q_{new}=(1/K_2)\times Q_{org}$$

is obtained. Accordingly, when the magnification $K_2$ is arbitrarily set, it is possible to simulate a resonance time of a suitable length.

Moreover, it is also possible to suppress an excessive resonant part or to emphasize an insufficient part by adjusting an output level G in each of the band pass filters $\mathbf{102}_1$ to $\mathbf{102}_N$.

It is to be noted that the above described manners are effective in a region where the center frequency of a band pass filter is substantially proportional to the coefficient F, but they cannot be applied to a region where the center frequency of a band pass filter is not proportional to the coefficient F, or a case where the center frequency exceeds a Nyquist frequency (fs/2).

Furthermore, it is known that there is such a tendency that components of low-pitched tone region are more remarkably affected by a structural factor such as a size or the like of the hollow body in an acoustic guitar, while components of the high-pitched tone region are more significantly affected by a material factor such as the hardness or the like of the hollow body due to different materials. Because of the reason described above, even if a hollow body is expanded or reduced while maintaining similar figures, the frequency characteristics are not parallelly displaced in response to the expansion or the reduction, but a phenomenon wherein variations in components of the high-pitched region are smaller than those of components of low-pitched region is observed.

Thus, it is suitable to use a transform of center frequency as expressed by formula 4 shown in FIG. 9 which is applicable even in a region where the center frequency of a band pass filter is not proportional to the coefficient F, or a case where the center frequency exceeds Nyquist frequency (fs/2), besides it is possible to simulate the properties peculiar to an acoustic guitar as described above by the formula 4. As expressed in formula 4, when a calculation is made by using the inverse of numbers, it is possible for the variations in components of high-pitched region to be smaller than those of components in low-pitched region.

Since formula 4 is a transform of center frequency, it may be arranged such that formula 2 is used on the basis of the $f_{new}$ determined by formula 4 to determine a coefficient $F_{new}$ with respect to the center frequency converted $f_{new}$, and the coefficient $F_{new}$ is utilized as a coefficient F of a band pass filter.

Figure 8:
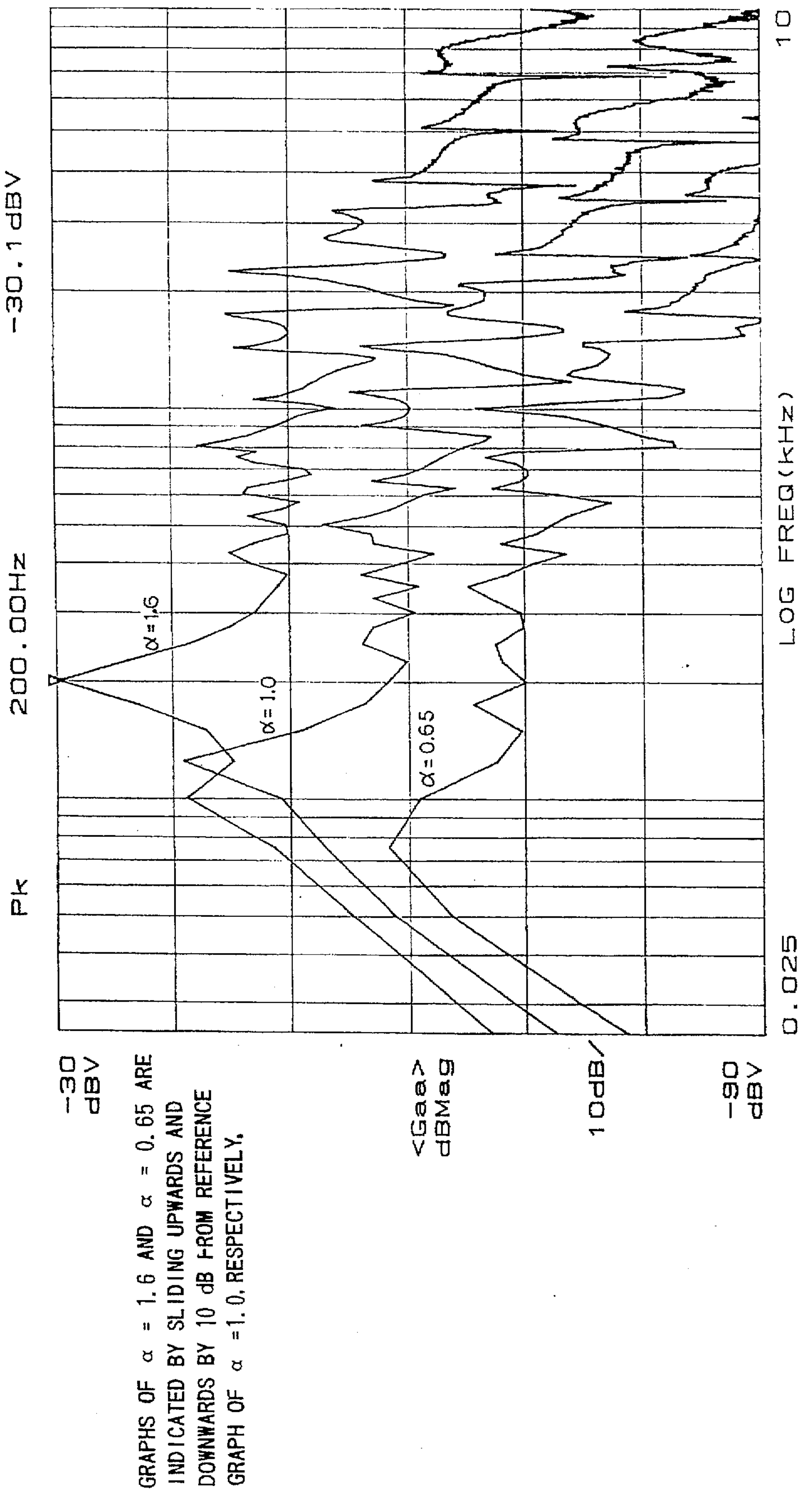
FIG. 8 is a graphical representation showing graphs of frequency characteristics in the case where magnifications of hollow body are $\alpha=0.65$, $\alpha=1.0$, and $\alpha=1.6$, respectively, wherein the graph of $\alpha=1.0$ is used as a reference graph, the graph of $\alpha=1.6$ is indicated by sliding upwards the same by 10 dB from the reference graph, and the graph of $\alpha=0.65$ is indicated by sliding the same downwards by 10 dB from the reference graph.

FIG. 8 is a graphical representation showing graphs of frequency characteristics in the case where magnifications of hollow body as $\alpha$=0.65, $\alpha$=1.0, and $\alpha$=1.6, respectively, wherein the graph of $\alpha$=1.0 is used as a reference graph, the graph of $\alpha$=1.6 is indicated by sliding upwards the same by 10 dB from the reference graph, and the graph of $\alpha$=0.65 is indicated by sliding the same downwards by 10 dB from the reference graph.

In the effecting system described in the second example of the above described manner of practice, although the band pass filters $\mathbf{102}_1$ to $\mathbf{102}_N$ have been connected in parallel, the filters are not limited to the band pass filters, but, as a matter of course, the constitution thereof may contain, for example, high pass filters or low pass filters. Particularly, it may be constituted such that only the filter means in the highest region is composed of high pass filters, and only the filter means in the lowest region is composed of low pass filters. While center frequency is controlled as the reference frequency in the case of employing the band pass filters, for instance, the cut-off frequency may be controlled as the reference frequency in the case of employing high pass filters or low pass filters.

Furthermore, a comb line filter may be added to the constitution of the above described effecting system shown in the second example of the manner of practice. For instance, in the constitution shown in FIG. 5, when the output of the adder 108 is inputted to a comb line filter, it is possible to simulate the frequency characteristics in a more delicate and complex manner.

Meanwhile, a filter means such as band pass filters $\mathbf{102}_1$ to $\mathbf{102}_N$ and the like to be connected in parallel in the constitution shown in FIG. 5 can simulate the much more delicate frequency characteristics with the more increased number of filter means to be connected. However, if the number of filter means increases, the rise in cost cannot be avoided. For this reason, when a constitution is arranged in such that the increase in the number of filter means to be connected in parallel is suppressed to prepare broader frequency characteristics, and then delicate and complex frequency characteristics are prepared by a comb line filter following thereto, precise frequency characteristics can be simulated with an inexpensive cost, so that it is very effective. As a matter of course, a position for connecting the comb line filter may be arbitrary, and musical tone signals which have passed the comb line filter may be adapted to be input to a plurality of the succeeding filter means connected parallell.

As described above, when the above described effecting system shown in the second example of the manner of practice is utilized, tones of acoustic guitar can be correctly simulated in the case where a size of the hollow body in an acoustic guitar with a hollow body to be simulated is expanded or reduced while maintaining similar figures.

Moreover, when reference frequencies of respective filter means are set in response to frequency characteristics of acoustic guitars of different shapes and a variety of types, it is possible to simulate tones of acoustic guitars having various shapes, respectively. Also, when their reference frequencies are corrected or similar modification is applied thereto, tones can correctly be simulated in the case where acoustic guitars of a variety of shapes are expanded or reduced.

While a guitar has been described as an example in each of the effecting systems shown in the above described first and second examples in the manner of practice, the effecting system according to the present invention is not limited to guitars, but it is applicable to various types of stringed instruments. More specifically, when the effecting system shown in the above described first example of the manner of practice is applied, for example, to an electric rubbed string-instrument, beautiful and extensive tones of an ordinary acoustic violin can be simulated. Moreover, when the above described effecting system shown in the second example of the manner of practice is applied similarly to an electric rubbed string-instrument, it becomes also possible to simulate differences in tones between violin groups having similar figures such as violin, viola, cello, contrabass and the like.

In addition, the above described effecting system shown in the first example of the manner of practice is connected in series to the effecting system shown in the second example of the manner of practice according to the present invention, it becomes possible to more correctly simulate tones of a stringed instrument with a hollow body such as an acoustic guitar and the like.

As described above, since the present invention is constituted in such that musical tone signals based on oscillations of strings which were detected by a pickup mounted on an electric guitar with a solid body are modified to simulate tones of an acoustic guitar with a hollow body, such an excellent advantage that musical tones being equivalent to those of the acoustic guitar with the hollow body can be obtained with only the electric guitar with the solid body is attained.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An effecting system for simulating tones of a musical instrument having strings comprising:

an absolute value detecting means for detecting absolute values of the amplitude values of musical tone signals corresponding to oscillations of the strings;

a delay time setting means for setting a delay time based on the absolute values detected by said absolute value detecting means; and a delay means for delaying said musical tone signals by the delay time which was set by said delay time setting means.

2. An effecting system comprising:

an absolute value detecting means for detecting absolute values of the amplitude values of signals obtained by mixing a plurality of musical tone signals corresponding to string oscillations of a plurality of strings;

a delay time setting means for setting delay times based on the absolute values detected by said absolute value detecting means; and a delay means for delaying a musical tone signal corresponding to a prescribed string in said plural musical tone signals by a delay time which was set by said delay time setting means.

3. An effecting system for simulating tones of a musical instrument having strings comprising:

a delay time setting means for setting a delay time based on the amplitude values of musical tone signals corresponding to oscillations of the strings;

a pitch detecting means for deleting pitches of said musical tone signals;

a delay time correcting means for correcting the delay time which was set by said delay time setting means such that the delay time produced shortens as the pitch based on the pitches detected by said pitch detecting means increases; and a delay means for delaying said musical tone signals by the delay time corrected by said delay time correcting means.

4. An effecting system for simulating tones of a musical instrument having strings comprising:

an absolute value detecting means for detecting absolute values of the amplitude values of musical tone signals corresponding to oscillations of the strings;

a delay time setting means for setting a delay time based on the absolute values detected by said absolute value detecting means;

a pitch detecting means for detecting pitches of said musical tone signals;

a delay time correcting means for correcting the delay time which was set by said delay time setting means such that the delay time produced shortens as the pitch based on the pitches detected by said pitch detecting means increases; and a delay means for delaying said musical tone signals by the delay time corrected by said delay time correcting means.

5. An effecting system comprising:

an absolute value detecting means for detecting absolute values of the amplitude values of signals obtained by mixing a plurality of musical tone signals corresponding to string oscillations of a plurality of strings;

a delay time setting means for setting delay times based on the absolute values detected by said absolute value detecting means;

a pitch detecting means for detecting a pitch of a musical tone signal corresponding to a prescribed string in said plural musical tone signals;

a delay time correcting means for correcting the delay time which was set by said delay time setting means such that the delay time produced shortens as the pitch based on the pitches detected by said pitch detecting means increases; and a delay means for delaying a musical tone signal corresponding to a prescribed string in said plural musical tone signals by a delay time which was corrected by said delay time correcting means.

6. An effecting system for simulating tones of a musical instrument having strings comprising:

a plurality of filter means into which are inputted musical tone signals corresponding to oscillations of the strings;

a synthesizing means for synthesizing outputs of said plural filter means; and a correcting means for correcting respective reference frequencies of said plural filter means which have been previously set such that the reference frequency produced decreases as the size of a hollow body increases, said size of the hollow body being the target of simulation, said reference frequencies spanning a low range and a high range of frequencies.

7. An effecting system as claimed in claim 6 wherein said correcting means corrects all the respective reference frequencies of said plural filter means which have been previously set at a uniform ratio, respectively.

8. An effecting system as claimed in claim 6 wherein said correcting means corrects the respective reference frequencies of said plural filter means which have been previously set such that an amount of the reference frequencies to be corrected in a low range is larger than that of the reference frequencies in a high range.

9. An effecting system as claimed in claim 6 wherein an all pass filter means to which are inputted musical tone signals corresponding to oscillations of strings is further provided, and to said plural filter means are inputted musical tone signals corresponding to the oscillations of strings which were passed through said all pass filter means.

10. An effecting system as claimed in claim 6 wherein at least one member selected from said plural filter means is a band pass filter, and the reference frequency of said band pass filter is the center frequency.

11. An effecting system as claimed in claim 6 wherein at least one member selected from said plural filter means is a low pass filter, and the reference frequency of said low pass filter is a cut-off frequency.

12. An effecting system as claimed in claim 6 wherein at least one member selected from said plural filter means is a high pass filter, and the reference frequency of said high pass filter is a cut-off frequency.

13. An effecting system for simulating tones of a musical instrument having strings comprising:

a plurality of filter means into which are inputted musical tone signals corresponding to oscillations of the strings;

a synthesizing means for synthesizing outputs of said plural filter means;

a storage means for storing sets of respective reference frequencies of said plural filter means which correspond to frequency characteristics of hollow bodies having a variety of sizes and are set such that the frequencies produced decrease as the sizes of said hollow bodies increase; and a setting means for selecting a set of reference frequencies corresponding to an information indicating a size of a hollow body being the target of simulation from the sets of the respective reference frequencies of said plural filter means stored in said storage means and setting the respective reference frequencies of the sets of reference frequencies selected to said corresponding plural filter means, respectively.

14. An effecting system as claimed in claim 13 wherein said setting means selects sets of reference frequencies in which all the respective reference frequencies of said plural filter means which are set at present are modified at a uniform ratio from the sets of reference frequencies stored in said storage means to set the respective reference frequencies of the sets of the reference frequencies selected to said corresponding plural filter means, respectively.

15. An effecting system as claimed in claim 13 wherein said setting means selects sets of reference frequencies in which the respective reference frequencies of said plural filter means which are set at present are modified in such a manner that an amount of the reference frequencies to be modified in a low range is larger than that of a high range from the sets of reference frequencies stored in said storage means to set the respective reference frequencies of the sets of the reference frequencies selected to said corresponding plural filter means, respectively.

16. An effecting system as claimed in claim 13 wherein an all pass filter menas to which are inputted musical tone signals corresponding to oscillations of strings is further provided, and to said plural filter means are inputted musical tone signals corresponding to the oscillations of strings which were passed through said all pass filter means.

17. An effecting system as claimed in claim 13 wherein at least one member selected from said plural filter means is a band pass filter, and the reference frequency of said band pass filter is the center frequency.

18. An effecting system as claimed in claim 13 wherein at least one member selected from said plural filter means is a low pass filter, and the reference frequency of said low pass filter is a cut-off frequency.

19. An effecting system as claimed in claim 13 wherein at least one member selected from said plural filter means is a high pass filter, and the reference frequency of said high pass filter is a cut-off frequency.

* * * * *